Figure 1:
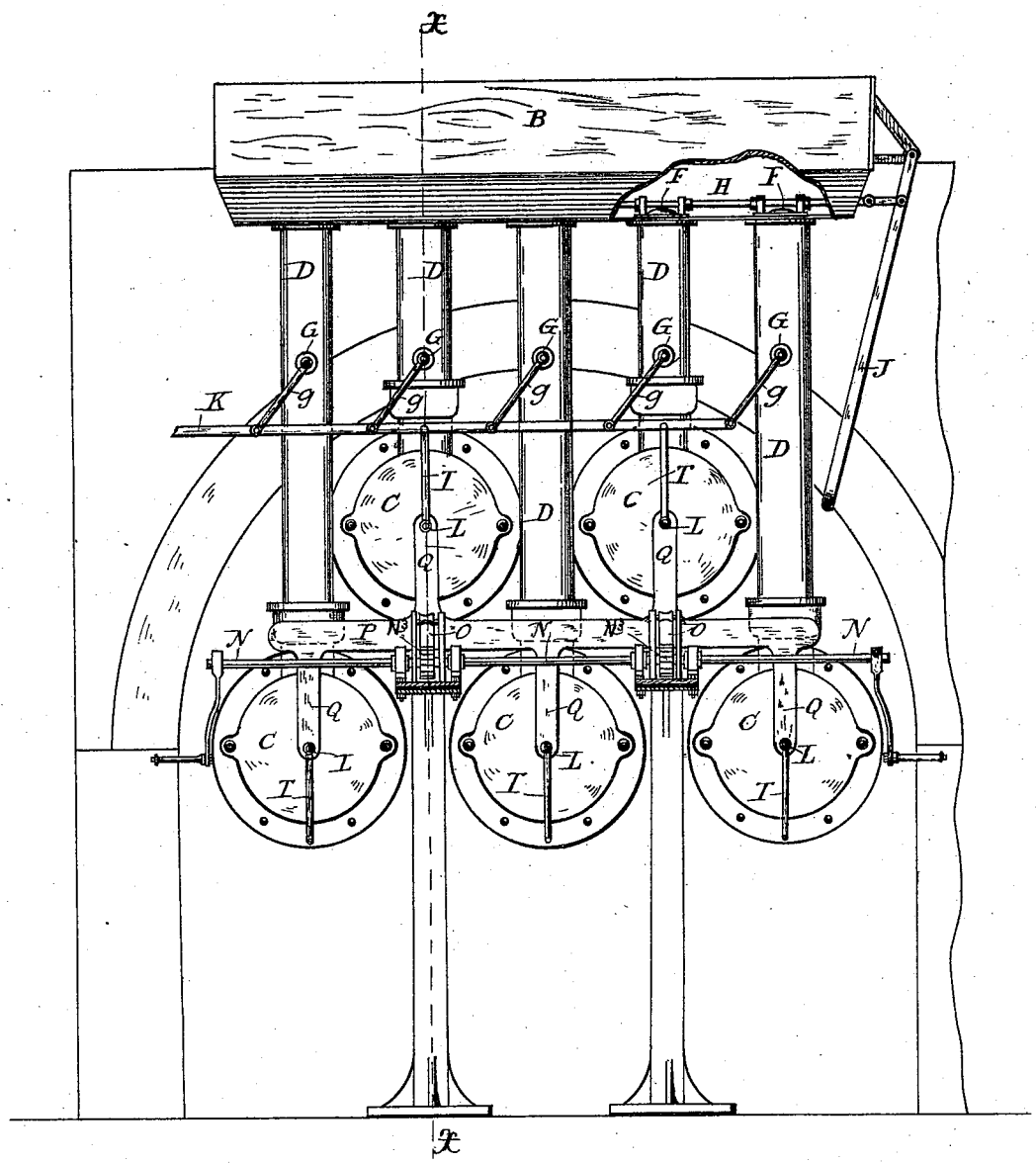

(No Model.) 11 Sheets—Sheet 1.

J. ELLIOTT.
APPARATUS FOR THE MANUFACTURE OF COAL GAS.

No. 456,140. Patented July 21, 1891.

WITNESSES
INVENTOR
James Elliott
By James N. Lancaster
Attorney (No Model.) 11 Sheets—Sheet 2.
J. ELLIOTT.
APPARATUS FOR THE MANUFACTURE OF COAL GAS.
No. 456,140. Patented July 21, 1891.

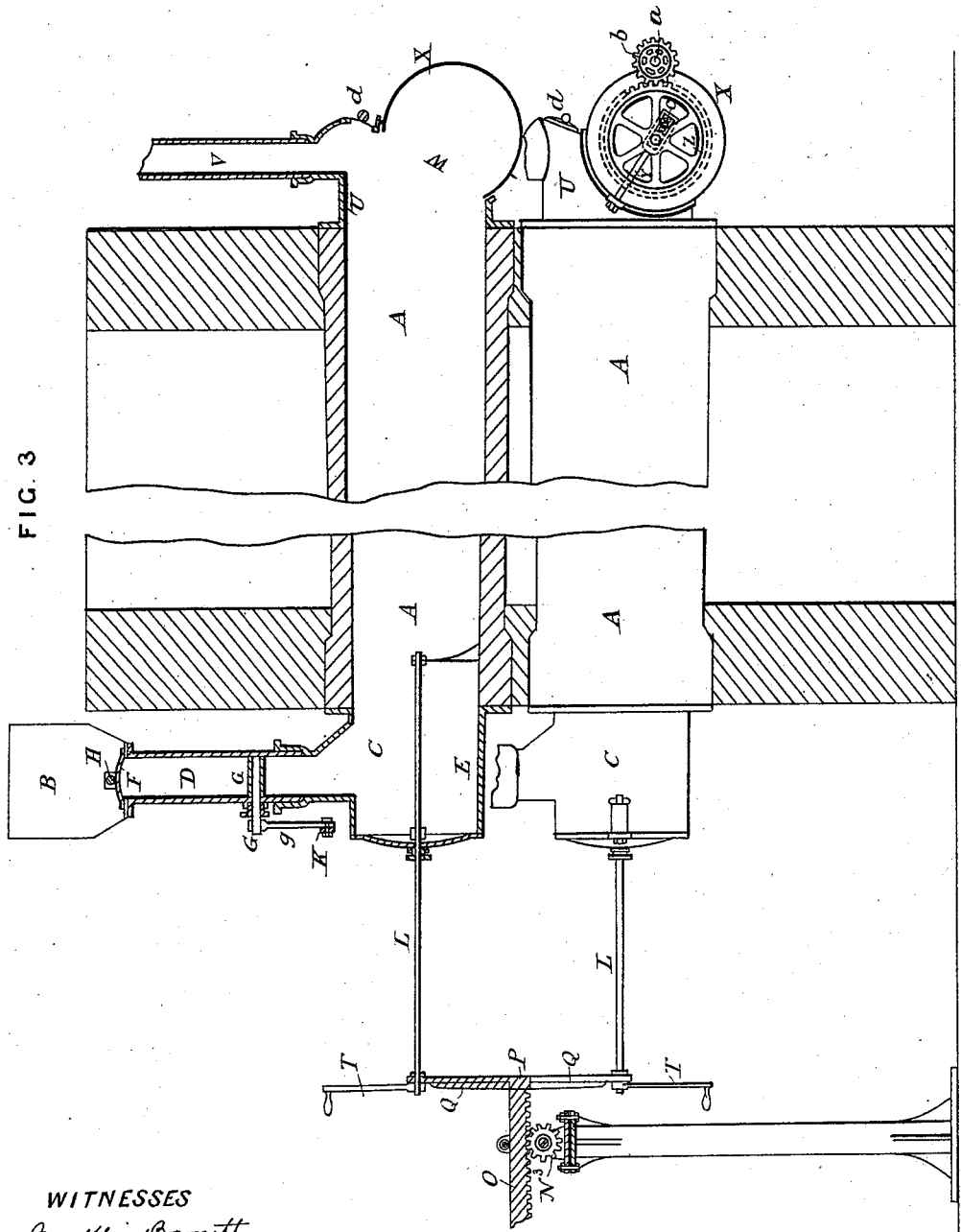

(No Model.)  
11 Sheets—Sheet 4.
J. ELLIOTT.
APPARATUS FOR THE MANUFACTURE OF COAL GAS.
No. 456,140. Patented July 21, 1891.
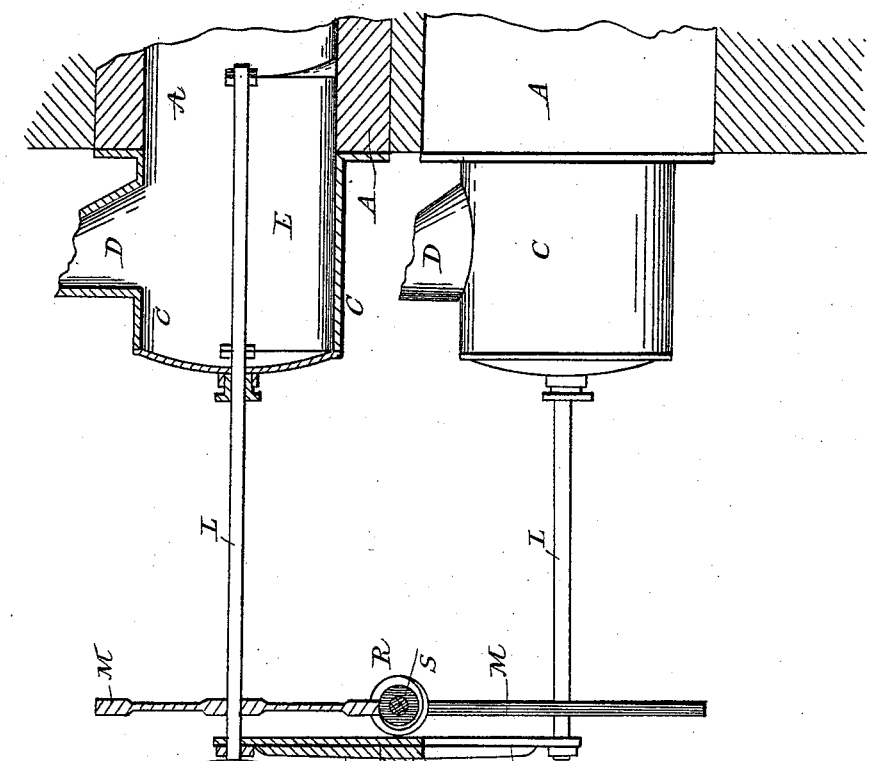
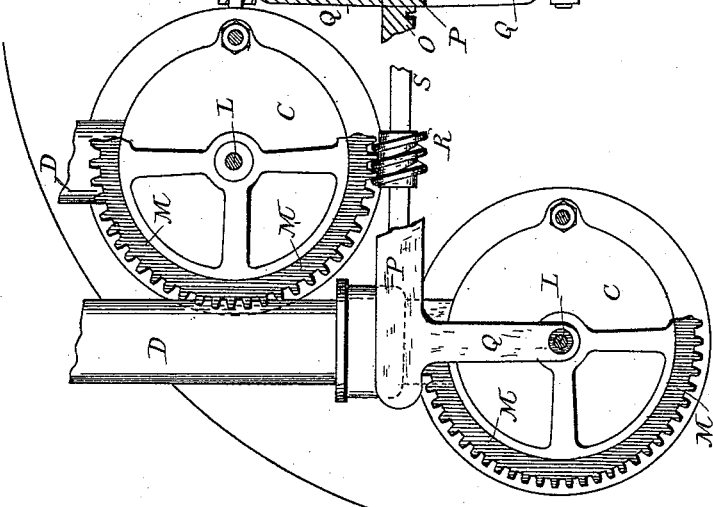
WITNESSES  
Franklin Barritt.  
B. F. Roberts
INVENTOR  
James Elliott  
By James H. Lancaster  
Attorney (No Model.) 11 Sheets—Sheet 5.
J. ELLIOTT.
APPARATUS FOR THE MANUFACTURE OF COAL GAS.
No. 456,140. Patented July 21, 1891.
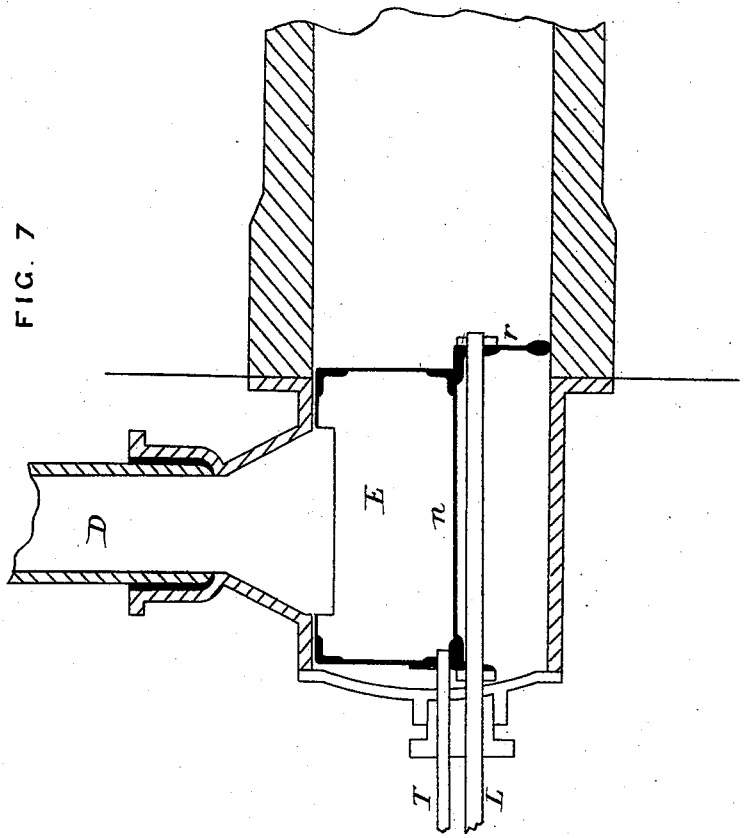
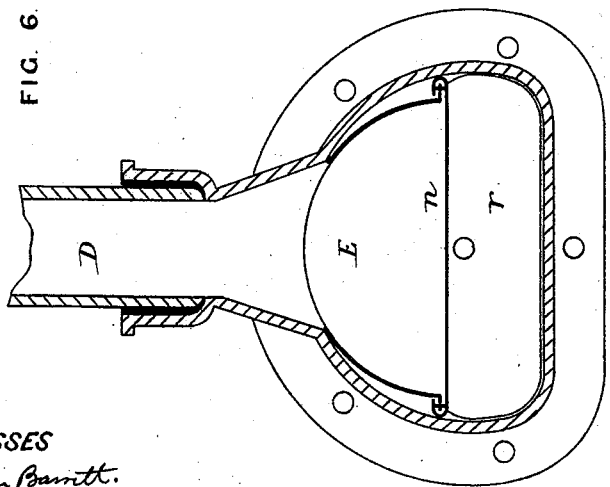
WITNESSES
Franklin Barritt.
D. F. Roberts.
INVENTOR
James Elliott
By James H. Lancaster
Attorney
THE NORRIS PETERS CO., PHOTO-LITHO., WASHINGTON, D. C.

(No Model.)  11 Sheets—Sheet 6.
J. ELLIOTT.
APPARATUS FOR THE MANUFACTURE OF COAL GAS.
No. 456,140. Patented July 21, 1891.
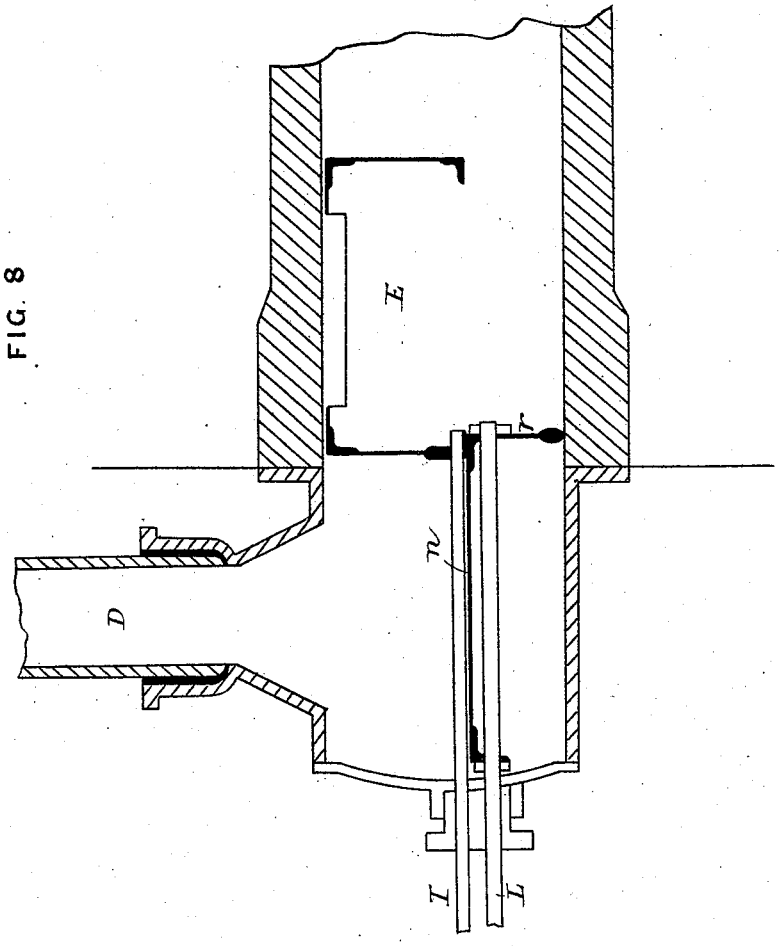
WITNESSES.  INVENTOR (No Model.) 11 Sheets—Sheet 7.
J. ELLIOTT.
APPARATUS FOR THE MANUFACTURE OF COAL GAS.

No. 456,140. Patented July 21, 1891.

WITNESSES:
Franklin Barrett.
B. F. Roberts

INVENTOR
James Elliott
BY
James N. Lancaster
ATTORNEY (No Model.) 11 Sheets—Sheet 8.
J. ELLIOTT.
APPARATUS FOR THE MANUFACTURE OF COAL GAS.
No. 456,140. Patented July 21, 1891.
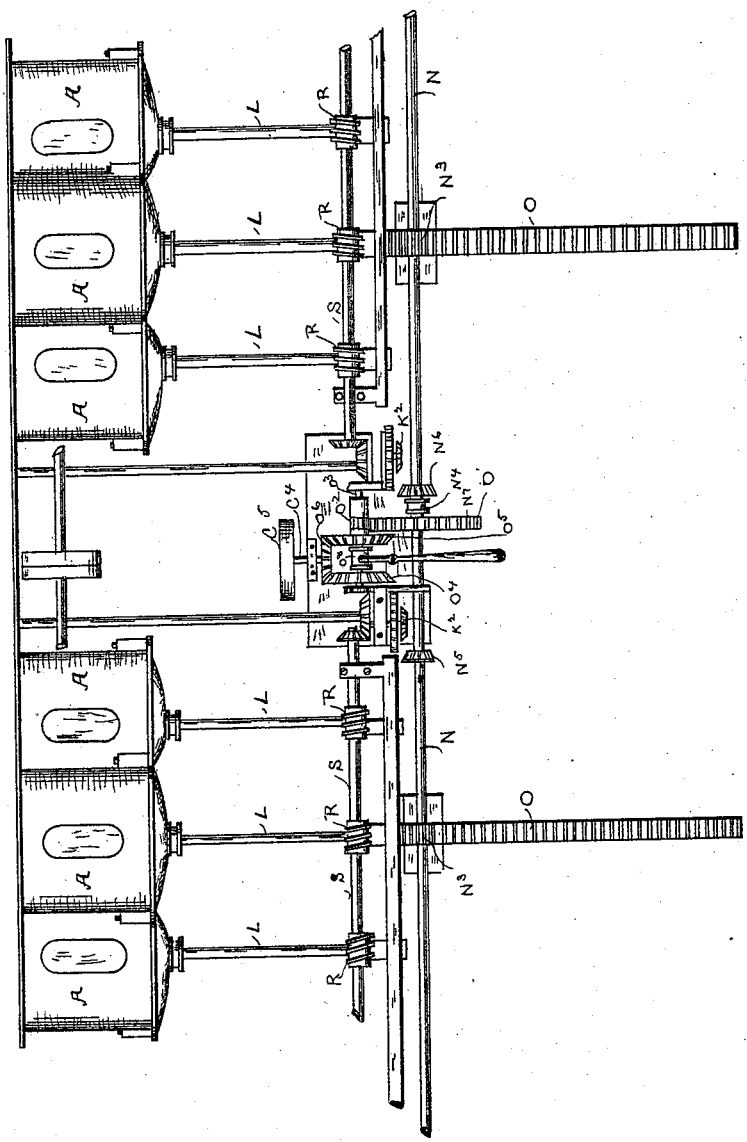
WITNESSES:
INVENTOR
James Elliott.
BY
James H. Lancaster
ATTORNEY.

(No Model.) 11 Sheets—Sheet 9.
J. ELLIOTT.
APPARATUS FOR THE MANUFACTURE OF COAL GAS.
No. 456,140. Patented July 21, 1891.
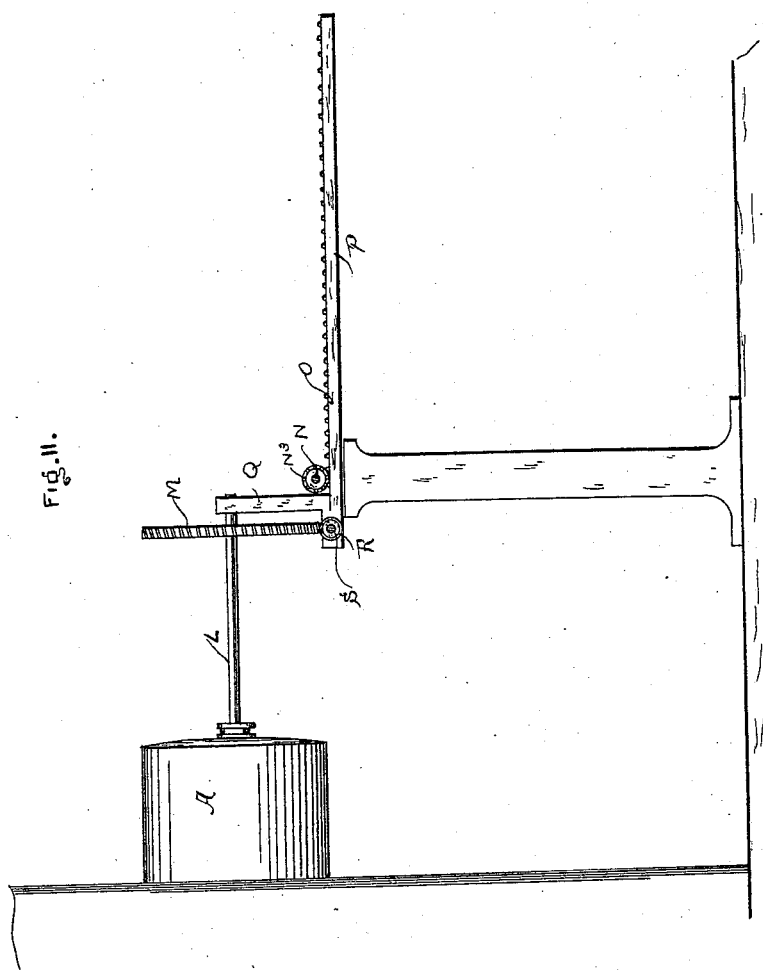
WITNESSES:
INVENTOR
James Elliott
BY
James H. Lancaster.
ATTORNEY (No Model.) 11 Sheets—Sheet 10.
J. ELLIOTT.
APPARATUS FOR THE MANUFACTURE OF COAL GAS.
No. 456,140. Patented July 21, 1891.
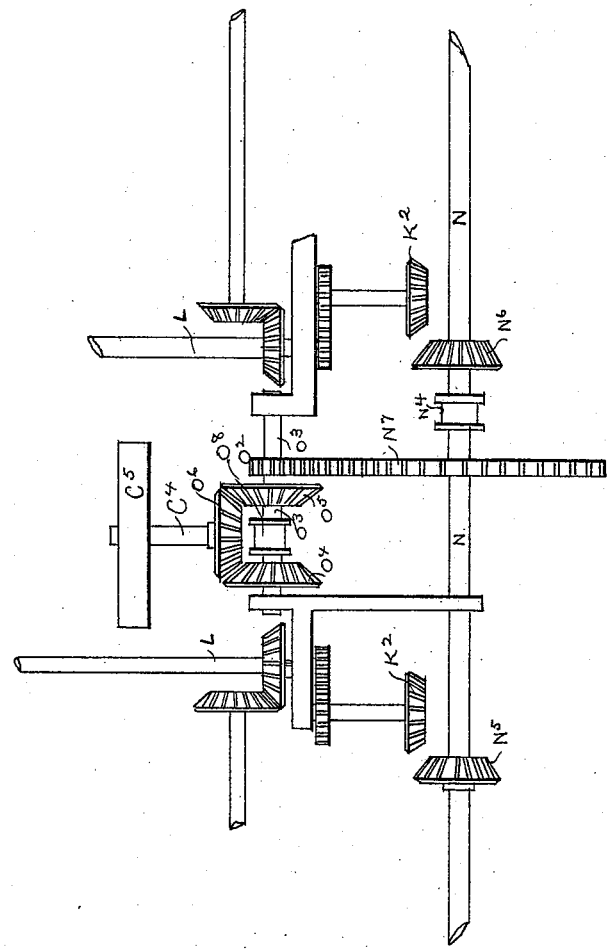
WITNESSES:
INVENTOR
James Elliott
BY
James N. Lancaster
ATTORNEY

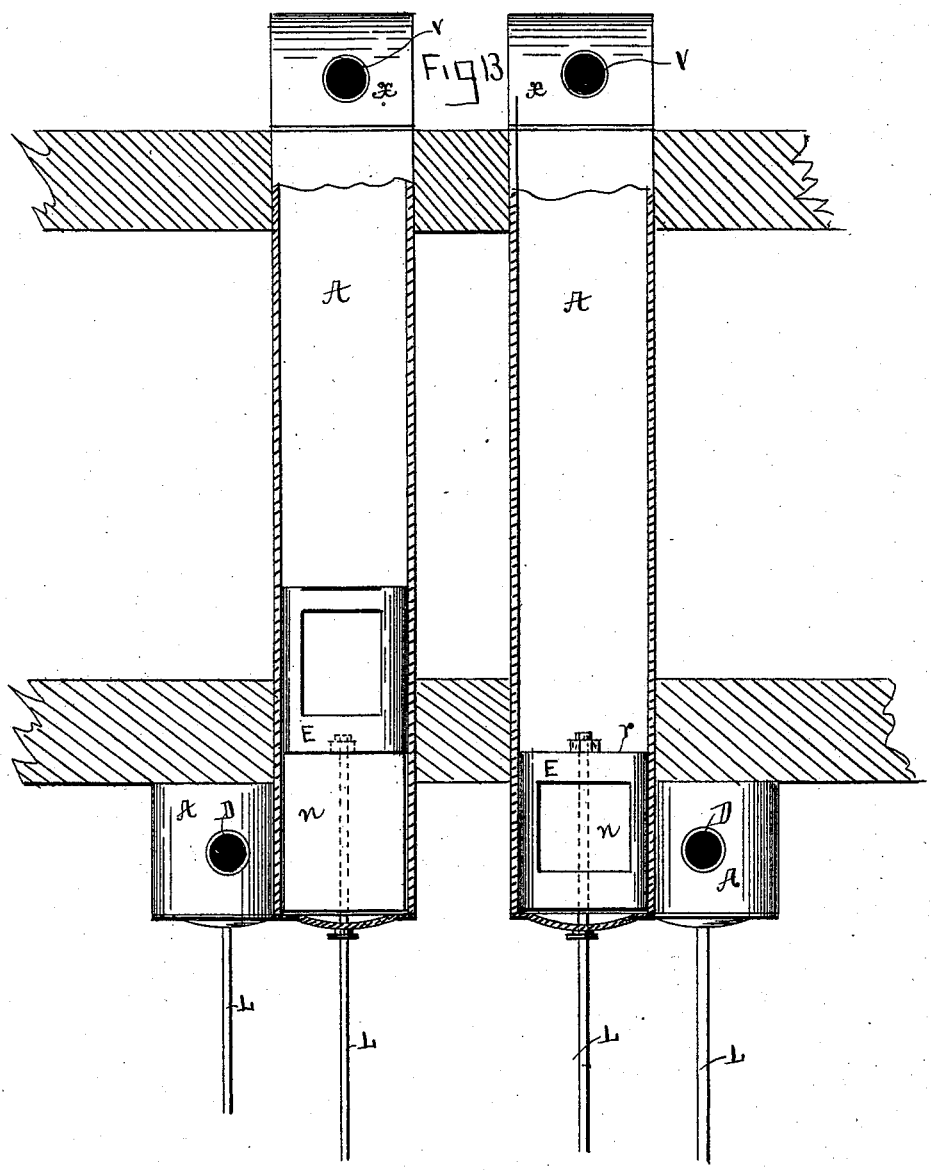

UNITED STATES PATENT OFFICE.

JAMES ELLIOTT, OF LUDLOW, ENGLAND.

APPARATUS FOR THE MANUFACTURE OF COAL=GAS.

SPECIFICATION forming part of Letters Patent No. 456,140, dated July 21, 1891.

Application filed July 23, 1890. Serial No. 359,620. (No model.) Patented in England April 15, 1887, No. 5,519, and August 8, 1888, No. 11,443.

*To all whom it may concern:*

Be it known that I, JAMES ELLIOTT, a subject of the Queen of Great Britain, and a resident of Ludlow, in the county of Salop, England, have invented certain new and useful Improvements in Apparatus for the Manufacture of Coal-Gas, (for which I have obtained a patent in Great Britain, No. 11,443, dated the 8th day of August, 1888, and No. 5,179, dated April 15, 1887,) of which the following is a full, clear, and exact specification.

The object of my invention is to produce an apparatus for carbonizing coal continuously.

In carrying my present invention into effect I preferably use retorts which are gradually larger as they approach the outlet end than they are at the feeding end to allow for the expansion of the coal during the process of the carbonization. I employ an open hopper, to which coal is supplied in any convenient manner and from which feeding-tubes descend to the retorts, as shown and described in the specification of the aforesaid patent. Instead, however, of employing the regulators as therein described, I now make such regulators as simple plates, loosely fitting the interior of the tubes and capable of being partially turned on their axes. In combination with these regulators I employ means for preventing the escape of gas from the retort while coal is being let into the scoop or charger inserted in the mouth-piece. This consists of a gas-tight cover to each feeding-tube working on a true surface fixed on the bottom of the hopper. These gas-tight covers are connected together by means of a rod operated by means of a lever or screw, so that on turning a wheel or moving lever they shall all open or close simultaneously. The regulators, which only require a quarter-turn to fully open them, may be turned separately by means of levers fixed on their axes, or they may be turned together by connecting the said levers to a rod. The scoop of each retort is, as described in my aforesaid specification, fixed to a rod or axis passing through the lid of the retort; but according to my present invention I fix on such rod or axis exterior of the retort-lid a semicircular toothed or worm wheel, and all of such toothed or worm wheels are operated simultaneously by worms or screws fixed to a shaft running along the front of the retorts. The scoops are, according to my present invention, thrust in or withdrawn simultaneously from the retorts by the following means: I employ a cross-bar provided with arms extending opposite the center of each retort and connected to the rod or axis of the scoop, and such cross-bar has connected thereto two or more toothed racks, which are taken into and driven to and fro by means of toothed wheels mounted on a shaft or axis supported in suitable bearings, so that on said shaft or axis being rotated the cross-bar will either advance or recede, carrying with it the rods or axes of the scoops, which latter will be thrust in or drawn out of the retorts by the action of the arms. As described in my aforesaid specification, the opposite or back end of each retort is fitted with a mouth-piece, which for the sake of distinction I will call a "tail-piece," and a discharging-cylinder, while the ascension-pipe rises from the tail-piece, and the latter is also fitted with a hand-hole and lid to enable the said ascension to be cleaned. According to this part of my present invention I keep the discharging-cylinders in contact with their seats in the tail-pieces by means of springs acting on their bearings, and instead of rotating such discharging-cylinders simultaneously by the means described in my aforesaid specification I may operate each of them separately by means of a handle attached to the axis of each cylinder, or I may operate them simultaneously by means of toothed wheels attached to the axes of the cylinders and operated by means of toothed pinions mounted on an operating-shaft controlling one series of discharging-cylinders; and in order that my said invention may be more clearly understood and readily carried into effect I will proceed, aided by the accompanying drawings, more fully to describe the same.

Figure 2:
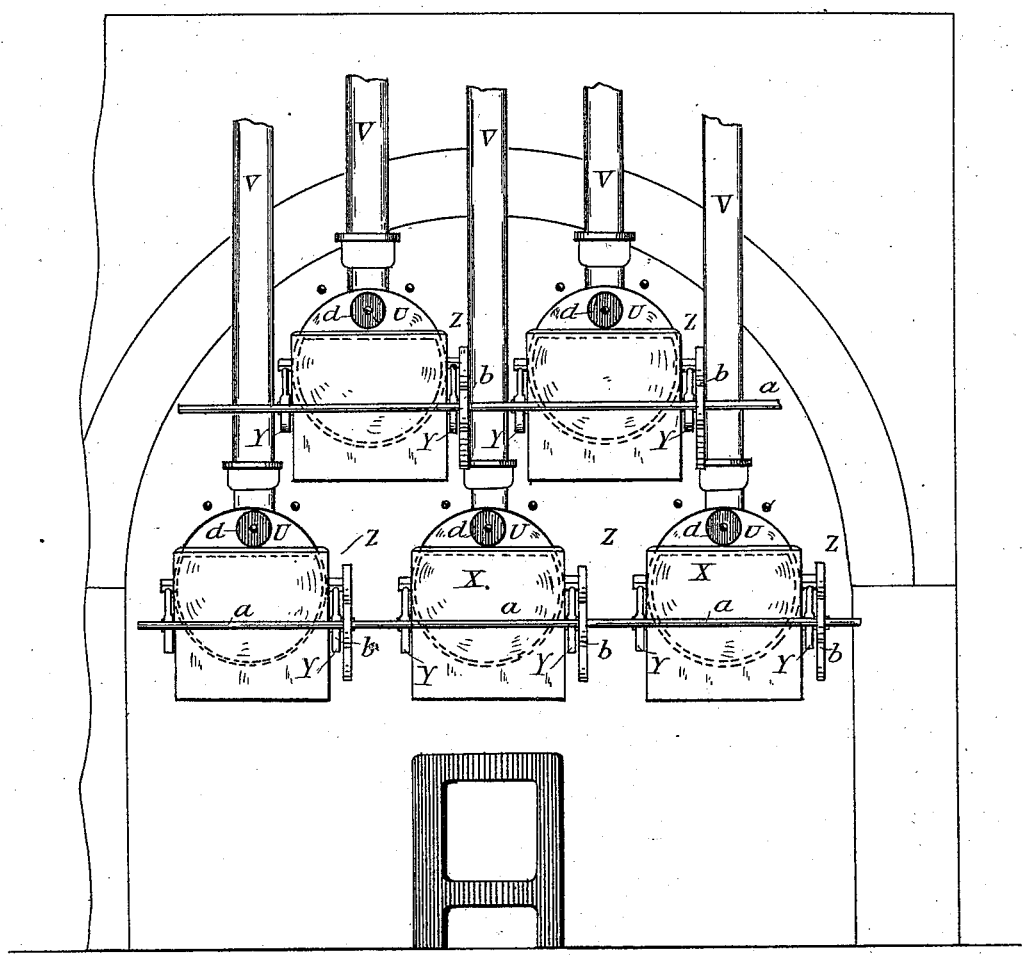
Figure 9:
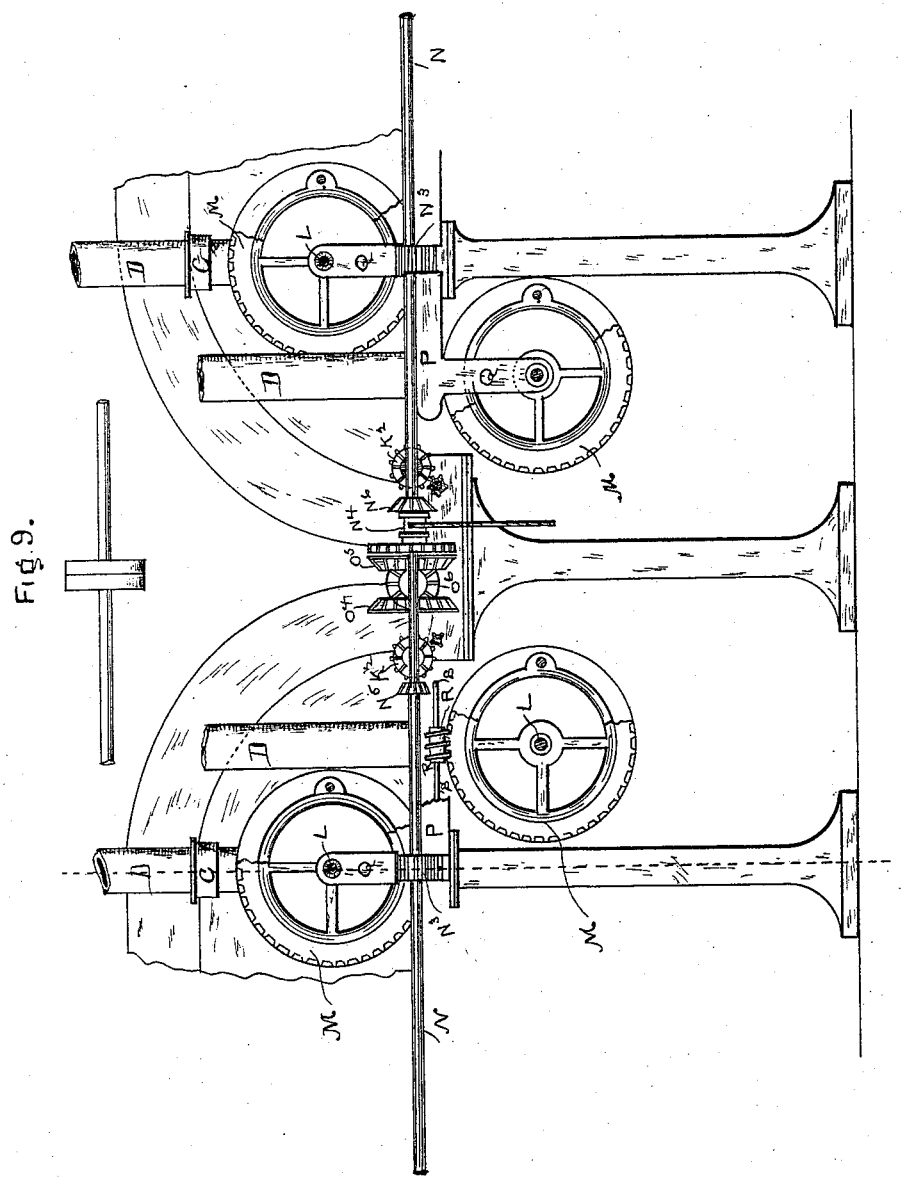

In the drawings, Figure 1 is a front elevation of a bench of retorts embodying my invention. Fig. 2 is a back end elevation of same. Fig. 3 is a section drawn on line x x, Fig. 1, representing a bench of retorts with some of my improvements applied thereto. Fig. 4 is a front elevation showing my improved means for simultaneously rotating the scoop or charger E of a bench of retorts. Fig. 5 is a sectional view of Fig. 4. Figs. 6, 7, and 8 show an arrangement of the charging-scoops. Fig. 9 is a front view of the bench of retorts embodying a modification of my principle, whereby the charging implements are moved outward and inward and revolved by the same mechanism. Fig. 10 is a plan view of Fig. 9. Fig. 11 is a sectional view of Fig. 9 on line $y\ y$. Fig. 12 is a detached enlarged plan view of the mechanism shown in Fig. 9. Fig. 13 is a plan sectional view of two retorts, one showing the charger ready to receive its load of coal and the other in the act of discharging the same.

In all the figures like parts are indicated by similar letters of reference.

A A are retorts, which may be of the ordinary character, or, as shown in the drawings, they may be larger at the outlet end to allow for the expansion of coal during the process of carbonization.

B is a small open hopper for containing a quantity of coal. This hopper is connected to the mouth-piece C of each retort by a pipe D. These pipes are provided with an arrangement to prevent the escape of gas while coal is being let into the scoops or chargers E, inserted in the mouth-pieces. The arrangement for each pipe D consists of a gas-tight cover F, working on a true surface fixed on the bottom of the hopper B, and a coal-regulator G, consisting of a simple plate loosely fitting the interior of the pipe D. The covers F F are connected by a rod H, so that on pulling the lever J they simultaneously close and open all the pipes D D, or the covers F F may be removed by the means of a screw.

The regulators G G, which only require a quarter-turn to open on full, may be opened separately by means of levers fixed on their axes, or they may be all opened simultaneously by connecting the levers to the rod K. The scoops E are fixed to a rod L, passing through the lid of the retort, and this rod may have a lever T attached to the other end, by which each scoop may be separately operated, or, according to my present invention, I may fix on each of such rods L a semicircular toothed wheel M, or it may be a cam geared to worm-wheels R R, fixed to the shafting S, as shown in Figs. 4, 9, 10, and 11.

In Figs. 6, 7, and 8 are shown the arrangement of scoops for charging oval or other shaped retorts and in which the scoops or charger E has an opening at the top for the admission of coal and is provided with a sliding bottom $n$. At the front side of the sliding bottom is a plate $r$ of the same shape as the lower half of the retort. Coal is let into the scoop while in the position shown in Fig. 3 with the bottom closed. Power is applied to the rod T L, causing the scoop to advance to the rear end of the retorts. The bottom is now withdrawn, thus depositing the coal on the bottom of the retort. The position of the scoop will be as shown in Fig. 8. The scoop is now brought back to its former position ready for another charge of coal. After a short interval, to allow the previous charge to become coked, the scoop is filled with coal and again pushed into the retort. In pushing forward the second charge the plate R in front of the scoop will push forward the charge already introduced. When the scoop has advanced as far as it did before, the bottom is again withdrawn and brought back, as before described. The fresh supply of coal will now be in the position of the former charge, the former charge being nearer the outlet end of the retort. After a few charges the coal, which has now become coke, will fall into the cylinders and be discharged at the same rate as coal is being supplied at the other end.

The scoops E are thrust into or withdrawn simultaneously from the retorts by means of a cross-bar P, having as many arms Q as there are retorts in a setting. Each scoop-rod L passes through an opening near the extremity of its respective arm, so that on the shaft N being made to revolve the pinions $N^3$ will operate on the racks O O, attached to the cross-bar, and cause the scoops to advance or recede. To the opposite or back end of the retort there is also a kind of mouth-piece U, which I call the "tail-piece," and from which the ascension-pipe V rises. The tail-piece is provided with a hand-hole $d$ for cleaning the said ascension-pipe. It has also an opening W, which corresponds with an opening in the short cylinder X, that is pivoted to arms Y Y, attached to the tail-piece. The tail-piece is made to a curve of a true circle, so that when the cylinder X is brought up against it the cylinder may turn, though in close contact with the facings of the tail-piece, and insures a gas-tight joint. The opening in the cylinders may be exposed for the discharge of coke by a handle attached to the axis of each cylinder X, or the whole may be actuated simultaneously by means of cogged wheels $b\ b$, fixed to the shaft $a$ and geared into other toothed wheels Z Z, attached to the cylinders. The bearings of the cylinders X X are mounted in slots in the arms Y Y, and are there supported by springs C C, which keep the cylinders in close contact with the tail-pieces.

The operative action of the apparatus, which is very simple, is as follows: The hopper B being charged with coal, the covers F F are withdrawn from the tops of the pipes D D. The coal then falls till it fills the space between F and G, which, when full, contains a fixed quantity of coal. The covers F F are returned till they close the openings at the top of the pipes D D. The regulators G G are opened, whereupon the coal will fall into the scoops below. The rods L, and consequently the scoops E, are then thrust in to their full length by the operation of the racks O and pinions N, and the scoops are, according to the arrangement shown at Figs. 1 and 3, turned over by means of the levers T, or, according to the arrangement shown at Figs. 4 and 5, they may be turned over simultaneously by revolving the shaft S. The coal will thus be deposited on the bottom of the retort ready for carbonization. The rods L are then drawn outward and the scoops returned to their former and normal position under the pipes D D. After a short interval, to allow the coal to become coked, the scoops are again charged with coal, thrust forward, and then turned over. In thrusting forward the second charge of coal the coal already introduced will be pushed toward the opposite end of the retort, and by repeating the operation the coal which has been converted into coke will fall through the opening in the tail-piece into the cylinder X. This cylinder, on being turned by the means hereinbefore described, will allow the coke to fall out of the opening in it into a barrow or other convenient receptacle. The coke will now be discharged at the same rate as coal is being introduced at the other end. By these means the work of the retort-house can be done by machine attendants only, stokers not being required.

By reference to Figs. 9, 10, 11, and 12, wherein a modification in the arrangement of the mechanism for operating the retort-charging implement or tool is shown, it will be noticed that the main parts thereof are adhered to. A clutch $N^4$ is placed upon shaft N, which likewise supports two bevel gear-wheels $N^5 N^6$. This shaft N is given a revolving motion by the gear-wheel $O^2$ on independent shaft $O^3$, gearing into cog-wheel $N^7$ on shaft N. The independent shaft $O^3$ derives or obtains its motion from the three bevel-wheels $O^4$, $O^5$, and $O^6$. $O^6$ is keyed on shaft $C^4$, having secured thereto the driving or belt pulley $C^5$. $O^8$ is a clutch for throwing into and out of gear the gear-wheels $O^4 O^5$ when it is required to have shaft N at rest. By moving the bevel-wheels $N^5$ and $N^6$ up against the bevel-wheels $K^2$ motion is thereby transmitted to the shafts L for revolving the chargers. Thus by the action of two clutches and their respective levers I am able to move the chargers at one and, if need be, the same time.

Having described the nature of my said invention and in what manner the same is to be performed, I claim as new and desire to secure by Letters Patent—

1. In a gas-producing apparatus, the combination of the retorts A, provided at their front ends with hoppers B, connected to the mouth-piece C by pipe D and at their rear ends with mouth-piece U, with ascension-pipe V, hole $d$, and opening W, corresponding with openings of cylinder X, pivoted to arms Y Y, and the chargers E, placed into said retorts and attached to rod L, passing through lids of retorts attached to toothed wheels M, acted upon by worm-wheels R R, secured to shafting S, all arranged to operate substantially as and for the purpose set forth.

2. The cylinder X, placed in the tail-piece of the retort A and pivoted to arms Y Y, said cylinder revolved by means of the cogged wheels $b$ $b$ on shaft $a$ and toothed wheel Z, substantially as and for the purpose set forth.

In testimony that I claim the foregoing I have hereunto set my hand this 30th day of December, 1889.

JAMES ELLIOTT.

Witnesses:
S. W. HICKMAN,
*Solicitor, Birmingham, a Commissioner to Administer Oaths in the Supreme Court of Judicature in England:*
W. FOX,
*Birmingham, his Clerk.*